Dec. 5, 1939.  A. F. KENYON  2,182,631
CONTROL SYSTEM
Filed Nov. 12, 1937  3 Sheets-Sheet 1

WITNESSES:

INVENTOR
Alonzo F. Kenyon.
BY
ATTORNEY

Dec. 5, 1939.   A. F. KENYON   2,182,631
CONTROL SYSTEM
Filed Nov. 12, 1937   3 Sheets-Sheet 3

WITNESSES:

INVENTOR
Alonzo F. Kenyon.
BY
ATTORNEY

Patented Dec. 5, 1939

2,182,631

UNITED STATES PATENT OFFICE 2,182,631

CONTROL SYSTEM

Alonzo F. Kenyon, Wilkinsburg, Pa., assignor to Westinghouse Electric & Manufacturing Company, East Pittsburgh, Pa., a corporation of Pennsylvania Applicaton November 12, 1937, Serial No. 174,189

12 Claims. (Cl. 172—239)

My invention relates to a system for operating mechanically coupled dynamo-electric machines in parallel, and, more particularly, to a system for securing proper load division and speed-load characteristics for machines so coupled and connected.

It has been found impractical to provide single motors for certain heavy loads, such as steel rolling mill drives, large enough to carry the whole load and it has been the practice to provide a plurality of motors with mechanically coupled armatures for driving such loads.

Where such systems of mechanically coupled motors have been employed there has previously existed very considerable difficulty in securing the proper division of the load between the two motors along with the most desirable speed-load characteristics.

An object of this invention is to provide a system for operating mechanically coupled dynamo-electric machines in parallel which shall function to divide the load between the machines in desired proportion and in addition shall function to secure a substantially flat speed-load characteristic curve for the machines.

Another object of the invention is to provide a system for operating mechanically coupled dynamo-electric machines in parallel which shall function to divide the load between the machines in predetermined proportion and in addition shall function to secure a substantially flat speed-load characteristic curve for the machines over wide ranges of speed and load.

Another object of the invention is to provide a control for the excitation of a plurality of dynamo-electric machines which shall function to automatically divide the load in a predetermined manner between the machines and also provide a substantially flat speed-load characteristic curve over a wide range of speed and load.

These and other objects and advantages of the invention will be apparent from the following detailed description taken in connection with the accompanying drawings in which.

In carrying out the preferred embodiment of my invention, I provide each of two mechanically coupled dynamo-electric machines with a plurality of compounding-field windings and energize one of these windings on each machine cumulatively in accordance with the load on the machine. Another of these windings on each machine is energized differentially in accordance with the load on the other machine. A third of these windings on each machine is energized either cumulatively or differentially, depending upon the nature of the compounding necessary to secure the proper speed-load characteristic in accordance with the total load on the two machines. This third winding will produce a normal net difference of excitation from the normal shunt field excitation which is varied by varying the resistance in the circuit of the third winding simultaneously with the varying of the resistance in the shunt field winding circuit, thus obtaining the proper compounding characteristics for each speed selected by variation of the shunt field excitation.

In another embodiment of the invention, differential and cumulative field windings are provided on each machine and the net difference of excitation necessary for proper speed regulation is obtained by a difference of energization of these cumulative and differential field windings. This difference of energization is obtained by using variable resistance in the energizing circuits for the compounding field windings and the proper compounding at the various speeds is obtained by varying these resistances simultaneously with the varying of the resistance in the shunt field winding circuit, thus securing the proper compounding characteristics for each speed selected by variation of the shunt field excitation.

In still another embodiment of the invention, differential and cumulative field windings are provided on each machine and the net difference of excitation necessary for proper speed regulation is obtained by a separate series field winding on each machine, each of which is energized by a separate series exciter, the excitation of which is varied with the load on its associated machine.

It is to be understood that the system of my invention, while described in connection with the operation of direct current motors coupled to a common load, also may be employed to control the load division and voltage regulation of direct current generators connected to a common load.

Figure 1:
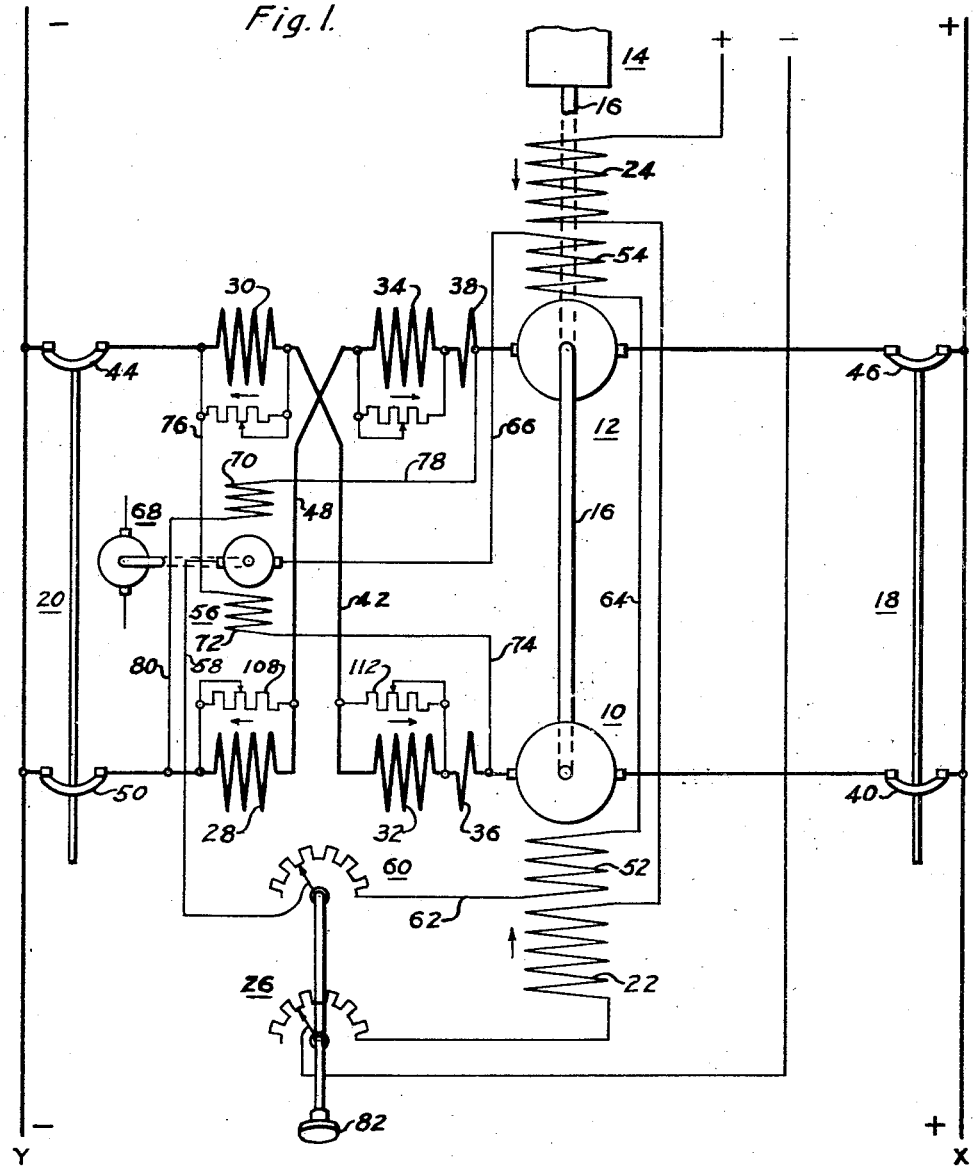
Figure 1 is a diagrammatic illustration of the preferred embodiment of my invention showing the cooperative relations of the several elements of the system.

Referring now to the drawings there is shown in Figure 1, motors 10 and 12 connected to drive the common load 14 by a shaft 16. Motors 10 and 12 are energized from the direct current source X—Y and are connected thereto by circuit breakers 18 and 20.

A main shunt field winding 22 is provided for motor 10 and a main shunt field winding 24 is provided for motor 12, these field windings being connected in series circuit with a rheostat 26 across a direct current power supply. The motors 10 and 12 are also provided with differential compounding field windings 28 and 30, respectively, cumulative compounding field windings 32 and 34, respectively, and interpole or compensating windings 36 and 38, respectively.

The circuit for the armature of motor 10 extends from the supply line X through contact element 40, the armature of motor 10, compensating winding 36, cumulative compounding field winding 32, conductor 42, differential compounding field winding 30 of motor 12, and contact element 44 to the other side of the power supply Y.

The armature circuit of the motor 12 extends from supply line X through contact element 46, through the armature of motor 12, compensating winding 38, cumulative compounding field winding 34, conductor 48, differential compounding field winding 28 of motor 10 and contact element 50 to the other side of the power supply Y.

Motors 10 and 12 are also provided with speed regulating field windings 52 and 54, respectively, and these windings are energized from an auxiliary exciter 56 through a circuit which includes the armature of auxiliary exciter 56, conductor 58, rheostat 60, conductor 62, field winding 52, conductor 64, field winding 54 and conductor 66 to the armature of auxiliary exciter 56.

The auxiliary exciter 56 is continuously driven by a motor 68 and is excited by the two field windings 70 and 72. Field winding 72 is connected across the compensating winding 36 and compounding windings 32 and 30 by a circuit which includes conductor 74, field winding 72 and conductor 76 and is thus energized in accordance with the drop across these windings 36, 32 and 30. Since the total drop across the windings 36, 32 and 30 is a measure of the load on the motor 10, it will be seen that the field winding 72 of auxiliary exciter 56 will be energized in accordance with the load on motor 10.

In a like manner the field winding 70 of auxiliary exciter 56 is connected across the compensating winding 38 and compounding windings 34 and 28 by a circuit which includes conductor 78, field winding 70 and conductor 80. It will be seen that the potential generated by the auxiliary exciter 56 is proportional to the total load on the two motors 10 and 12 and that the speed regulating field windings 52 and 54 are, therefore, excited in direct proportion to the total load on the two motors 10 and 12.

The rheostat 26 which varies the current flow in the main field windings 22 and 24 and rheostat 60 which varies the flow of current in the speed regulating field windings 52 and 54 are operated simultaneously by operating handle 82, so that the strength of the speed regulating fields 52 and 54 may be made to vary in accordance with the variations of the energization of the main field windings 22 and 24, when these fields are varied by the operator to secure the desired speeds of motors 10 and 12. This is done because it is necessary that the auxiliary speed regulation fields 52 and 54 have a different value of excitation for each value of main field excitation to provide the proper flat speed regulation curve for the motors 10 and 12 at the different speeds of the motors.

In the operation of the device of Fig. 1, if for any reason one of the motors tends to take more than its share of the total load, the excitation of its compounding field windings will be so varied as to tend to cause its speed to decrease and the excitation of the compounding field windings of the other motor will be so varied as to tend to cause its speed to increase.

As an example, supposing that the motor 10 tends to take more than its share of the load. Its armature current will then increase, causing an increase in its cumulative excitation which will increase its total field excitation and tend to slow the motor down. At the same time the differential compounding winding 30 of motor 12 which is connected in series with the armature of motor 10 will decrease the excitation of motor 12 and will cause motor 12 to tend to increase its speed. This tendency of motor 10 to decrease its speed will cause the load on the motor 10 to decrease, and the tendency of motor 12 to increase its speed will cause the load on the motor 12 to increase, and in this way the load division between the motors will be automatically restored.

The speed regulation field windings 52 and 54 may be either cumulative or differential windings, depending upon the characteristics of the motor and the type of speed regulation required. It will be seen that in the event that the load on both motors increases, the excitation of the field windings 52 and 54 will increase because of the increased excitation of the auxiliary generator 56 and the proper compounding for speed regulation of motors 10 and 12 will thus be provided.

Figure 2:
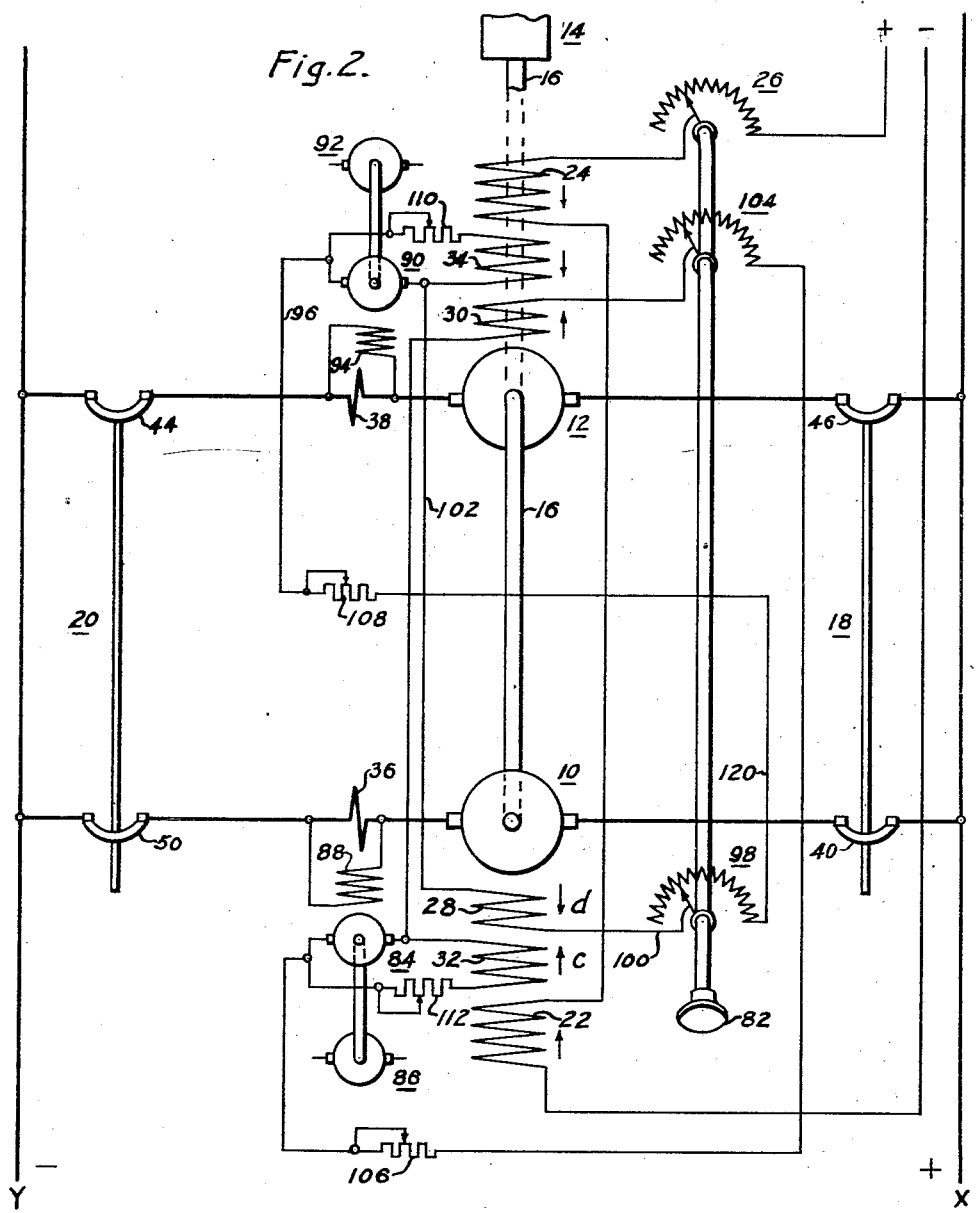
Fig. 2 is a diagrammatic illustration of another embodiment of my invention.

In Fig. 2 of the drawings there is shown another system for providing the desired load division between two motors connected to a common load and also for providing the desired speed regulation for these motors. Like reference characters refer to like parts in the two figures of the drawings.

Referring to Fig. 2, the armatures of motors 10 and 12 are connected in series with their compensating windings 36 and 38, respectively, and through circuit breakers 18 and 20 to the source of direct current represented by conductors X—Y. Shunt field windings 22 and 24 are provided for motors 10 and 12, respectively, and are connected to a separate source of direct current in series with the rheostat 26.

Motor 10 is provided with a cumulative compounding field winding 32 and a differetial compounding field winding 28, and motor 12 is provided with a cumulative compounding field winding 34 and a differential compounding field winding 30.

An auxiliary exciter 84 is continuously driven by motor 86 and its field winding 88 is connected to be energized in accordance with the drop across compensating winding 36 of motor 10, so that the potential generated by the auxiliary exciter 84 is directly proportional to the load on motor 10.

In like manner, auxiliary exciter 90 is continuously driven by motor 92 and has its field winding 94 energized in accordance with the drop across the compensating winding 38 of motor 12 and the potential generated by the auxiliary exciter 90 is, therefore, directly proportional to the load on motor 12.

The cumulative compounding field winding 32 of motor 10 is connected in series with a variable resistance 112 directly across the armature of the auxiliary exciter 84 and the cumulative compounding field winding 34 of motor 12 is connected in series with a variable resistance 110 directly across the armature of the auxiliary exciter 90.

The differential compounding field winding 28 of motor 10 is connected to be energized by the potential generated by the auxiliary exciter 90 associated with motor 12 through a circuit which includes the armature of auxiliary exciter 90, conductor 96, variable resistance 108, conductor 120, rheostat 100, conductor 100, differential field winding 28 and conductor 102 back to the armature of auxiliary exciter 90. In like manner the differential compounding field winding 30 of motor 12 is connected to the armature of the auxiliary exciter 84 associated with motor 10 through a rheostat 104 and variable resistance 106. It will thus be seen that the excitation of differential compounding field winding 28 of motor 10 varies with the load on motor 12 and that the excitation of the differential compounding field winding 30 of motor 12 varies with the load on motor 10.

The differential and compounding field windings 28 and 32 are so chosen as to not permit the excitation of these two windings to cancel each other under normal conditions of load balance between the two motors, but rather to give a resultant net compounding excitation which will serve as a speed regulation excitation for the motor 10. In a like manner a resultant speed regulation excitation is provided for motor 12.

Since it is necessary for proper speed regulation to also vary the amount of compounding as the main field excitation of the motors 10 and 12 is varied by use of the rheostat 26, it is necessary that the difference between the excitations provided by the cumulative and differential compounding field windings 28 and 32 of motor 10 and the cumulative and differential compounding field windings 34 and 30 of motor 12 be so adjusted that the difference in the excitations varies with the variations of the excitation of the main shunt field windings 22 and 24. This variation is provided by rheostats 98 and 104 which are operated simultaneously with rheostat 26 by a common operating handle 82. In this manner it will be seen that the speed regulation compounding of the motors will be caused to vary simultaneously with the manual variations of the main shunt field excitation of the motors.

In describing the operation of the system of Fig. 2, it may be assumed that the motors 10 and 12 are of substantially the same capacity and are carrying their proportionate shares of the common load 14. Then their shunt field currents will be equal, the excitation of auxiliary exciters 84 and 90 will be substantially equal, the excitation of the cumulative field windings 32 and 34 will be substantially equal, and the excitation of the differential field windings 28 and 30 will be substantially equal. If, now, motor 10 takes more than its share of the load, its armature current will increase, and because of the increased excitation of auxiliary exciter 84 caused thereby, the cumulative compounding of motor 10 will be increased and the differential compounding of motor 12 will be increased, causing motor 10 to tend to slow down and to thus assume less of the load and causing motor 12 to tend to speed up and thus to assume a greater amount of load. Thus the load balance will be automatically reestablished between the two machines.

If the load on both machines increases, it will be seen that the difference between the excitations provided by the cumulative and differential field windings on the two machines will increase accordingly to provide the necessary degree of compounding to effect the desired speed regulation.

In the event that it is desired to increase the speeds of the machines, rheostat handle 82 may be rotated in a counter-clockwise direction to decrease the excitation of main shunt field windings 22 and 24, and at the same time, rheostats 98 and 104 will be operated to vary the current in the differential field windings 28 and 30 to thus vary the resultant flux produced by the cumulative and differential field windings of the two motors to provide the proper speed regulation compounding at the new value of main shunt field excitation.

Figure 3:
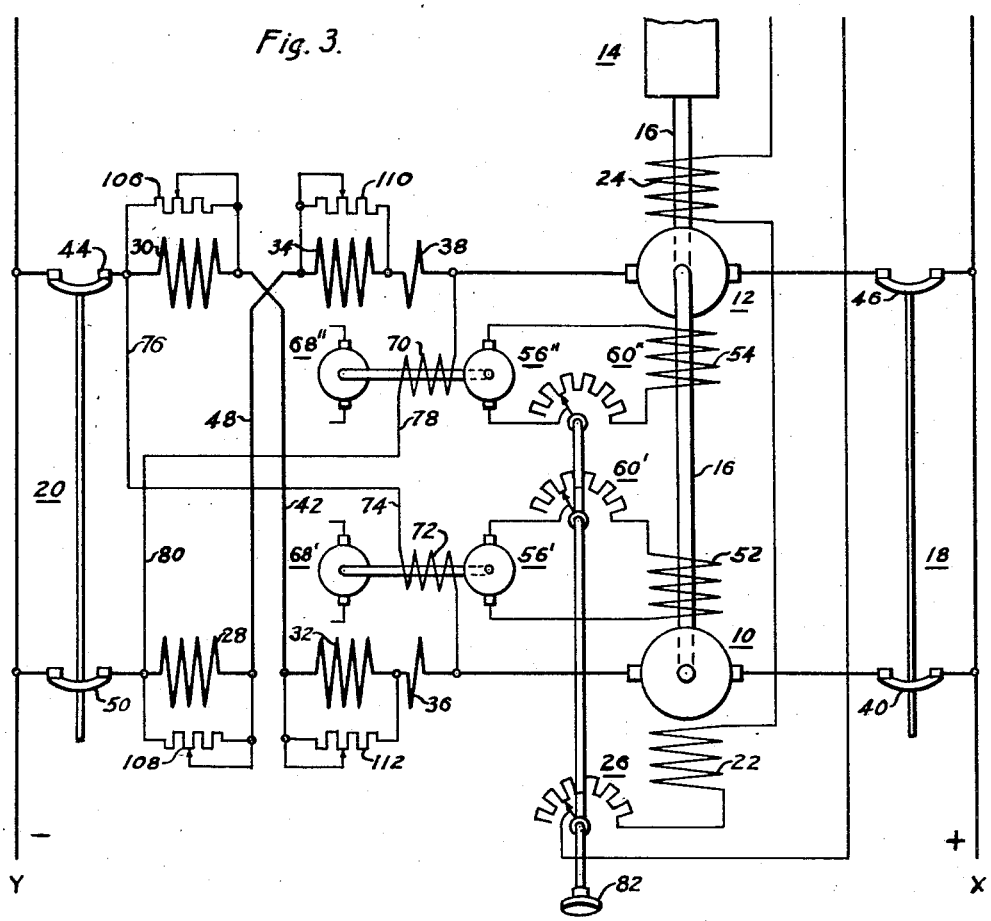
Fig. 3 is a diagrammatic illustration of still another embodiment of my invention.

The modification of Fig. 3 is generally similar to that of Fig. 1 except that individual auxiliary exciters 56' and 56" are provided for energizing the speed regulating compounding field windings 52 and 54 of motors 10 and 12, respectively, instead of the single auxiliary exciter 56. The auxiliary exciters 56' and 56" are continuously driven by motors 68' and 68" and are provided with field windings 72 and 70, respectively.

In this modification, the energization of the speed regulating field windings is manually varied simultaneously with the manual variation of the speed of the motors by means of rheostats 60' and 60" which are mechanically connected to vary the resistance in the circuits of field windings 52 and 54 simultaneously with the adjustment of rheostat 26.

It will be understood that in the operation of this system the individual rheostats 60' and 60" may be so designed that for each increment or step in the movement thereof, the necessary variations in the energization of field windings 52 and 54 may be secured. This is desirable in order to compensate for differences in the two motors which may have different characteristics because of manufacturing variation if they are duplicate motors, or in the event that the motors are of different manufacture.

In other respects, so long as the load is substantially equally divided or divided in the desired proportion between the two motors, the system of Fig. 3 will operate to divide the load and provide the desired speed regulation substantially the same as the system of Fig. 1.

Figure 4:
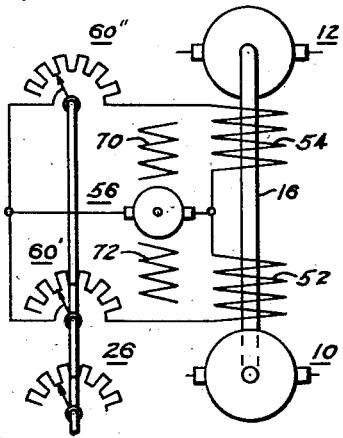
Fig. 4 is a diagrammatic illustration of auxiliary field and series exciter connections which may be substituted for the connections of these elements in the embodiment of Fig. 1.

Another method of compensating for variations in the characteristics of the two motors is shown in Fig. 4. The system of Fig. 4 is a modification of Fig. 1 with the speed regulation field windings 52 and 54 connected in parallel with the single auxiliary exciter 56 and having individual rheostats 60' and 60" for separately varying the excitation of these field windings simultaneously with the adjustment of the main field rheostat 26. Since this is the only difference between the systems of Figs. 1 and 4, the complete system is not shown in Fig. 4.

As explained in connection with Fig. 3, the rheostats 60' and 60" may be designed and adjusted to compensate for the differences in the characteristics of the two motors 10 and 12.

While the main shunt field windings 52 and 54 of the motors 10 and 12 are shown connected in series circuit relation and, therefore, are energized to the same degree, it is to be understood that these field windings may be connected in parallel circuit relation and provided with individual rheostats to secure any desired degree of excitation.

The operation of the systems of Figs. 1, 2 and 3 has been described with the assumption that the motors 10 and 12 are of the same capacity and have the same characteristics and that it is desired that the load be divided equally between the motors. It is understood that in the event that these motors are not of the same capacity or do not have the same characteristics, or in the event that it is desired to place more load upon one motor than upon the other, suitable resistances may be inserted by means of variable resistors 106, 108, 110 and 112 to affect the cumulative and differential compounding field windings to provide the desired load division between the two motors.

It will be seen that I have provided systems for automatically maintaining a desired load division between two motors or generators connected to a common load while at the same time providing the desirable speed regulation characteristics for the motors, and that I have further provided means for automatically maintaining the proper speed regulation excitation for the motors necessary to obtain the proper speed regulation at the different adjusted speeds of the motor.

In compliance with the requirements of the patent statutes, I have shown and described herein the preferred embodiments of my invention. It is understood, however, that the invention is not limited to the precise constructions shown and described but is capable of modification by one skilled in the art, the embodiments herein shown being merely illustrative of the principles of my invention.

I claim as my invention:

1. In combination, a pair of motors, a main field for each of said motors, means for varying the main field excitation of both of said motors, means for varying the excitation of each of said motors in accordance with the variations of load on the motor, means for varying the excitation of each of said motors in accordance with the variations of load on the other motor, means for maintaining a difference of excitation between the total excitation and the main field excitation of the motors, and means for varying said difference of excitation in accordance with variations of the main field excitation.

2. In combination, a plurality of dynamo-electric machines, means for providing a steady excitation for each of said machines, means for changing the amount of said steady excitation, means for varying the excitation of each of said machines in accordance with variations in the loading of the machine, means for varying the excitation of each of the machines in accordance with the loading of the other machines, means for maintaining a difference of excitation between the steady excitation and the total excitation of the machines, and means for varying said difference of excitation in accordance with changes in the amount of said steady excitation.

3. In a system for operating mechanically coupled motors in parallel in which each of the motors is provided with a main field winding, a series field winding energized in accordance with the load on the motor and a series field winding energized in accordance with the load on the other motors, means for maintaining a predetermined normal difference of excitation between the series field windings on each of the motors, and means for changing the value of said difference of excitation in accordance with changes in the excitation of the main field windings of the motors.

4. In a system for operating a pair of mechanically coupled motors in parallel, a main field winding for each of said motors, means for varying the energization of said main field windings, a pair of auxilary field wndngs for each of said motors, means for energizing one of said auxiliary field windings of each of said motors cumulatively with respect to its main field winding and in accordance with the load on the motor, means for energizing the other of said auxiliary field windings of each of said motors differentially with respect to its main field winding and in accordance with the load on the other motor, means for maintaining a normal difference between the values of the excitations produced by the cumulative and differential auxiliary field windings, and means whereby said difference of excitations is varied simultaneously with the variation of the energization of the main field windings.

5. In a system for operating a pair of mechanically coupled dynamo-electric machines in parallel, a main field winding for each of said machines, a variable resistor for varying the energization of said main field windings, a pair of auxiliary field windings for each of said machines, means or energizing one of said auxiliary field windings of each of said machines cumulatively with respect to its main field winding and in accordance with the load on the machine, means for energizing the other of said auxiliary field windings of each of said machines differentially with respect to its main field winding and in accordance with the load on the other machine, variable resistors connected to produce a normal difference between the values of the excitations produced by the cumulative and differential auxiliary field windings, and means for simultaneously actuating said main field resistor and said last named resistors.

6. In combination, a pair of dynamo-electric machines having their armatures mechanically coupled and connected to a common load, means for varying the excitation of each of said machines in accordance with the variations in load on its armature, means for varying the excitation of each of said machines in accordance with the variations of load on the other armature, and means for varying the excitation of both of said machines in response to variations in the total load on both machines.

7. In a system for operating a pair of mechanically connected dynamo-electric machines in parallel, a main field winding for each of said machines, means for varying the energization of said main field windings, a plurality of auxiliary field windings for each of said machines, means for energizing one of said auxiliary field windings of each of said machines cumulatively with respect to its main field winding and in accordance with the load of the machine, means for energizing another of said auxiliary field windings of each of said machines differenttially with respect to its main field winding and in accordance with the load on the other machine, means for energizing a third auxiliary field winding of each of said machines in accordance with the total load on both of the machines, and means for simultaneously varying the energization of said third auxiliary field winding and actuating said means for varying the energization of said main field windings.

8. In combination, a pair of mechanically-coupled parallel-connected dynamo-electric machines, a main field winding for each of said machines, a plurality of auxiliary field windings for each of said machines, means for energizing one of said auxiliary field windings of each of said machines cumulatively with respect to its main field winding and in accordance with the load on the machine, means for energizing another of said auxiliary field windings of each of said machines differentially with respect to its main field winding and in accordance with the load on the other machine, means for energizing a third auxiliary field winding of each of said machines in accordance with the total load on both of the machines.

9. In combination, a pair of dynamo-electric machines, a main field winding for each of said machines, a cumulative and a differential field winding for each of said machines, a generator associated with each of said machines, means for exciting each of said generators in proportion to the load on its corresponding machine, each of said generators being connected to the cumulative field winding of its associated machine and to the differential field winding of the other machine, an adjustable resistor in circuit with each of said differential field windings, an adjustable resistor in circuit with each of said main field windings, and means for simultaneously adjusting said resistors.

10. In combination, a pair of dynamo-electric machines, a main field winding for each of said machines, a cumulative and a differential field winding for each of said machines, an auxiliary field winding for each of said machines, each of said cumulative windings being connected in circuit with the armature of its associated machine, each of said differential field windings being connected in circuit with the armature of the other machine, an auxiliary generator, means for exciting said generator in proportion to the total load on the two machines, said generator being connected in circuit with said auxiliary field windings, a variable resistor in circuit with said main field windings, a variable resistor in circuit with said auxiliary field windings, and means for simultaneously varying said resistors.

11. In combination, a pair of dynamo-electric machines, a main field winding for each of said machines, a cumulative and a differential field winding for each of said machines, an auxiliary field winding for each of said machines, each of said cumulative windings being connected in circuit with the armature of its associated machine, each of said differential field windings being connected in circuit with the armature of the other machine, an auxiliary generator associated with each of said machines, means for exciting each of said generators in proportion to the load on its associated machine, each of said generators being connected with the auxiliary field winding of its associated machine, a variable resistor in circuit with said main field windings, a variable resistor in circuit with each of said auxiliary field windings, and means for simultaneously adjusting said variable resistors.

12. In combination, a pair of dynamo-electric machines, means for providing a steady excitation for each of said machines, a cumulative and a differential field winding for each of said machines, each of said cumulative windings being connected in circuit with the amature of its associated machine, each of said differential windings being connected in circuit with the armature of the other machine, means for providing an auxiliary excitation for each of said machines variable in accordance with the variations of the load on the respective machines, and means for simultaneously changing the amount of steady excitation and said auxiliary excitation of said machines.

ALONZO F. KENYON.